T. H. SCHAEFER.
FRONT WHEEL DRIVE MECHANISM.
APPLICATION FILED APR. 23, 1920.

1,420,387. Patented June 20, 1922.

INVENTOR
T. H. Schaefer

BY
Adam E. Fisher
ATTORNEY

T. H. SCHAEFER.
FRONT WHEEL DRIVE MECHANISM.
APPLICATION FILED APR. 23, 1920.

1,420,387.

Patented June 20, 1922.
3 SHEETS—SHEET 3.

INVENTOR
T. H. Schaefer
BY
Adam E. Fisher
ATTORNEY

UNITED STATES PATENT OFFICE.

THOMAS H. SCHAEFER, OF ST. LOUIS, MISSOURI.

FRONT-WHEEL DRIVE MECHANISM.

1,420,387.  Specification of Letters Patent.  Patented June 20, 1922.

Application filed April 23, 1920. Serial No. 376,092.

*To all whom it may concern:*

Be it known that I, THOMAS HILBREN SCHAEFER, a citizen of the United States, residing in the city of St. Louis and State of Missouri, have invented new and useful Improvements in Front-Wheel Drive Mechanisms, of which the following is a specification, reference being had to the accompanying drawings.

The present invention pertains to front wheel drives for motor vehicles, whereby power is transmitted from the engine and transmission shaft through the axle shaft to the front wheels, the same as to the rear wheels.

As ordinarily constructed, motor vehicles are driven from the rear wheels alone, which construction is thought to cause an undue strain upon those wheels and to carry other incidental disadvantages.

It is the primary purpose of this invention, therefore, to provide a simple, efficient and durable front wheel drive mechanism.

Another object is to provide a front drive mechanism of the character described embodying a number of beveled gears so mounted as to transmit the motion from the transmission shaft through the axle shaft to the front wheels and at the same time permit the turning of the front wheels, for the purpose of rounding curves.

In the drawings as represented the form of construction as first thought out by the inventor:

Figure 1:
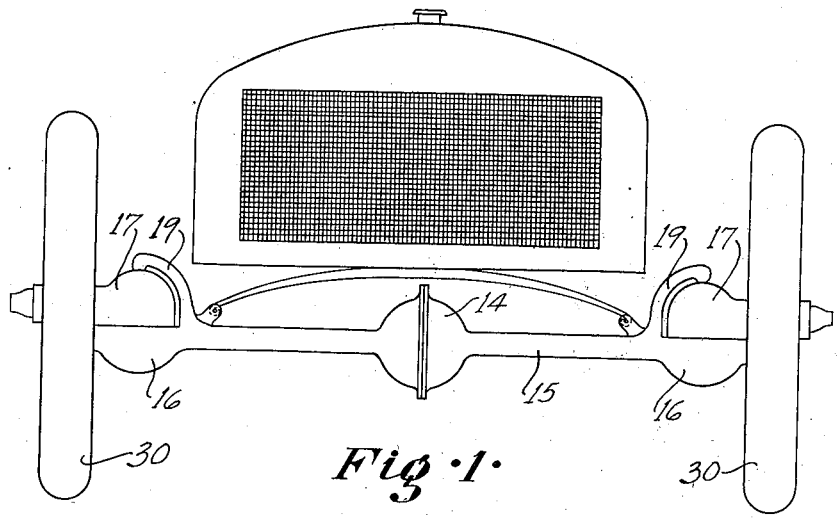
Figure 1 is a front elevation of the motor vehicle equipped with this improvement.
Figure 2:
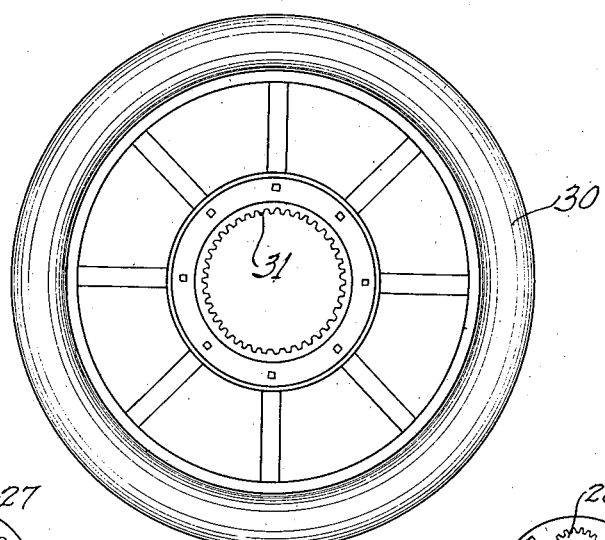
Figure 2 is a side elevation of one of the front wheels showing the internal gear at the hub as part of the mechanism.
Figure 3:
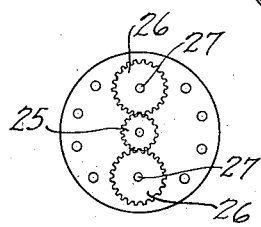
Figure 3 is a detail of the mechanism showing the gears of which the same is composed.
Figure 4:
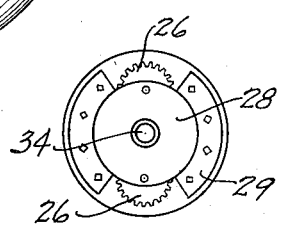
Figure 4 is a similar detail of the same mechanism with brace plates secured in place.
Figure 5:
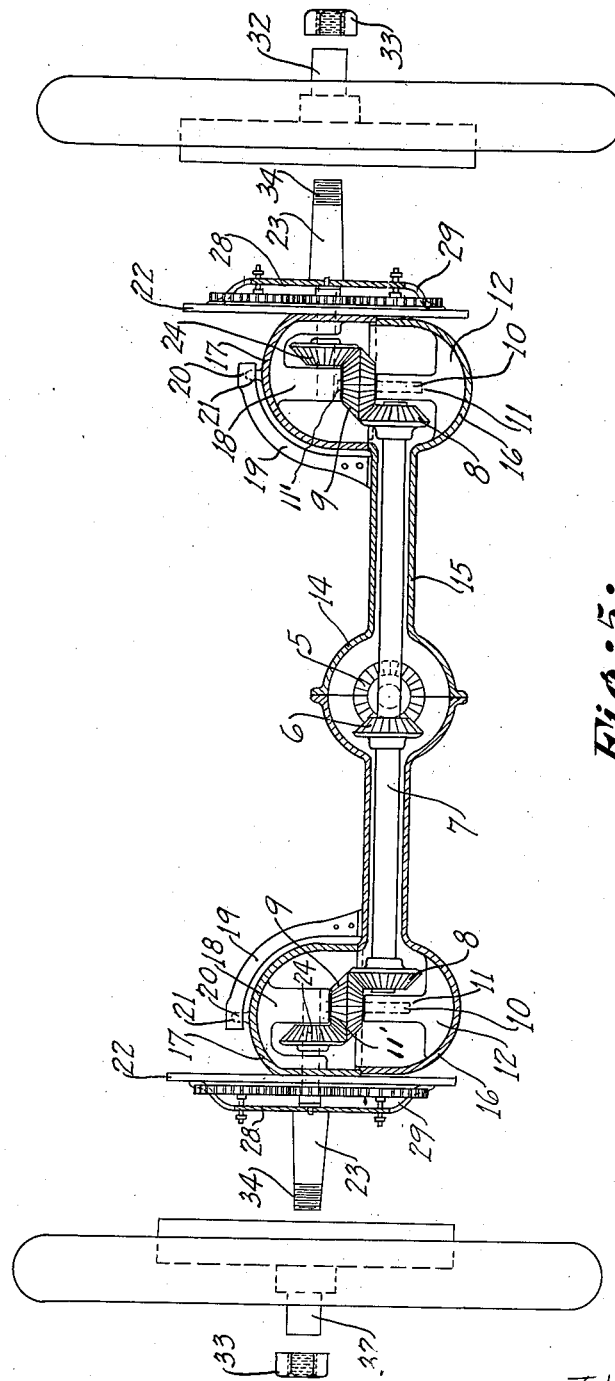
Figure 5 is a longitudinal, vertical section through the front axle shaft and housings, showing the gears, however, and the spindles in full.
Figure 6:
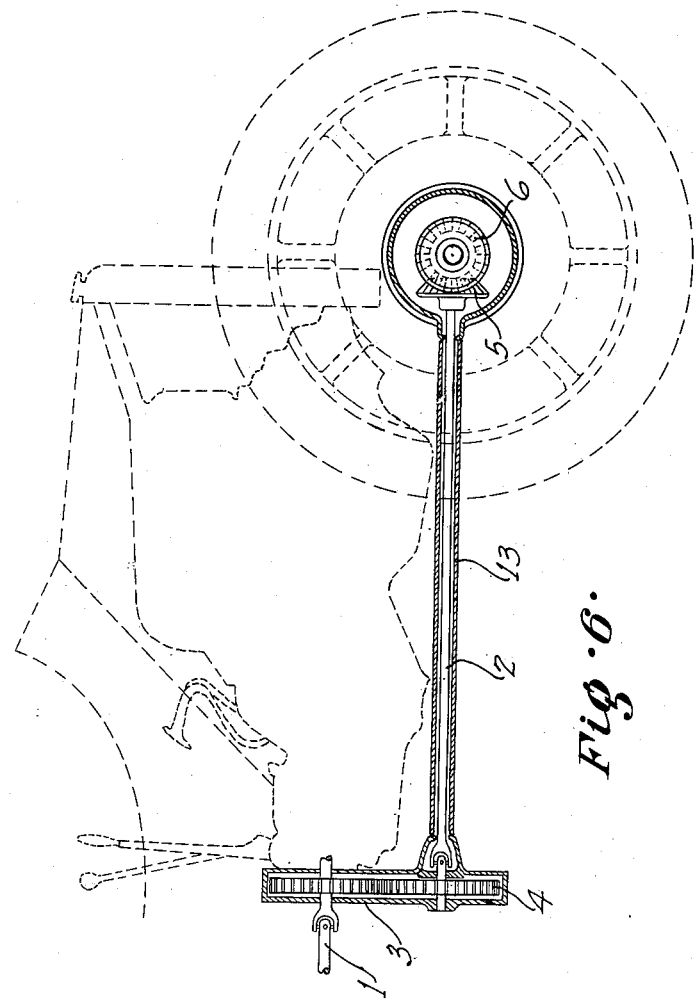
Figure 6 is a cross or side section showing how power is transmitted to the front wheels.

Referring more particularly to the drawings, in carrying out the invention as illustrated, I mount below the ordinary drive shaft 1 a secondary drive shaft 2, power being transmitted to the shaft 2 through the intermeshing gears 3 and 4. At the forward end of the secondary shaft 2, I rigidly mount the bevel gear 5, adapted to mesh with a similar bevel gear 6, rigidly mounted upon the front axle shaft 7. A suitable housing 13 is provided for the secondary shaft 2, a housing 14 for the gears 5 and 6, a housing 15 for the axle shaft 7, and lower half housings 16 for the outer gears. The lower half housings 16 are rigidly connected with the axle shaft housing 15. The axle shaft 7 extending laterally to each side is provided at each end with a rigidly mounted bevel gear 8 and these gears intermesh with the lower teeth of the double bevel gears 9. The gears 9 are rigidly mounted upon gear pins 10 and are disposed horizontally and at right angles to the gears 8. For this purpose, the pins 10 are rotatably journaled in the vertical sockets 11, which are formed in the lower webs 12 in vertical alignment with the axle shaft 7. The webs 12 are permanently mounted within the base of the half housings 16. Upper half housings 17 are provided and adapted to slidingly engage and turn upon the lower half housings 16, and have their outer faces flattened perpendicularly to the said axle shaft 7. Upper webs 18 are permanently mounted within these upper half housings 17 and, extending downwardly, the sockets 11 engage the upper, extended ends of the pins 10. Arms 19 are rigidly mounted upon the upper face of the housing 15 and extended upwardly and outwardly over the topmost points of the half housings 17. These arms 19 are provided with sockets 20 at their outer free ends, which sockets are adapted to pivotally engage the studs 21 rigidly mounted upon the tops of the half housings 17. Thus the half housings 17 are adapted to rotate in a horizontal plane upon the half housings 16. The outer faces of the half housings 15 are flattened, as stated, and circular gear plates 22 are rigidly fastened thereto. Wheel spindles 23 pierce the gear plates 22 at their central points, and piercing also the housings 17 and webs 18', are rotatably journaled in the webs 18. Bevel gears 24 are rigidly mounted on the inner ends of these spindles 23 and adapted to intermesh with upper teeth of the double bevel gears 9; thus the spindles 23 are rotatably mounted in place, and may readily turn from side to side, being sustained by the bearings described. Central, spur gears 25 are rigidly mounted upon the spindles 23 immediately adjacent the exterior faces of the gear plates 22. Two or more spur gears 26 are rotatively mounted upon the same faces of each of the plates 22 by means of pins 27, and the gears 26 are adapted to mesh with the gears 25. Brace plates 28 are mounted over the outer faces of the gears 25 and 26, the pins 27 being extended into said plates and the spindles 23 passing rotatively therethrough. These plates 28 are held apart from the differential plates 22 sufficiently to accommodate the gears 25 and 26 aforesaid by means of toe plates 29. The front wheels 30 are provided at the inner sides of their hub portions with the rigidly mounted internal gears 31, which are adapted to mesh with the gears 26 when the wheel is in place. The wheels 30 are provided with ordinary hubs 32, adapted to rotatively engage the spindles 23, and are secured in place with the usual outer nuts 33 which screw upon the threads 34.

In operation, the rotative power is transmitted through the secondary shaft 2 to the axle shaft 7 and thence through the bevel gears to the spindles 23 and wheels 30. The wheels 30 may be readily turned in horizontal planes in usual manner, by any ordinary steering apparatus, the upper half housings 17 turning upon the lower half housings 16 for this purpose.

While I have herein described a certain specific method of constructing and assembling the elements of my invention, it is understood same may be varied in minor details, not departing from the spirit of my invention as defined in the appended claims.

What I claim to be new and patentable is:

1. In combination with the front axle shaft and wheels of a motor vehicle, a front drive mechanism therefor, comprising a secondary drive shaft journaled horizontally back of and perpendicular to said axle shaft; gear connections between said drive shaft and axle shaft; suitable housings for the elements enumerated; a lower half-housing rigidly extended from each end of the axle shaft housing; an upper, complementary half housing for each lower half housing, same being adapted to meet and turn upon the latter in a horizontal plane, and having its outer face flattened perpendicularly to the axle shaft; a circular gear plate rigidly mounted upon the outer, flattened face of each upper half housing; a wheel spindle rotatively journaled perpendicularly through the center of each said gear plate and into the upper, vertical, transverse web of the upper half housing; a spur gear rigidly mounted upon each wheel spindle immediately adjacent the exterior face of the gear plate; a plurality of pins ranged in a circle on the outer face of each gear plate, around said central spur gear of the wheel spindle; a plurality of spur gears mounted over said pins, and in mesh with said central spur gear; brace plates mounted over the outer faces of said gears; an internal gear rigidly mounted on the inner side of each wheel, around the hub thereof, same being adapted to mesh with said gears while the hub is freely secured upon its spindle in usual form; means for connecting said power transmission shaft with the motor in order to rotate the shaft; and connecting gears mounted within said half housings, between the ends of the axle shaft and the wheel spindles, for rotating the latter through the former.

2. In combination with the front wheels, the axle shaft and housing of a motor vehicle, a drive mechanism for the wheels, comprising turning bearings for the wheels composed of lower half housings rigidly extended from the axle shaft housing at each end, and upper half housings adapted to meet and pivotally turn upon the lower half housings in a horizontal plane, the outer faces of the upper half housings being flattened to facilitate mounting the wheels; gear plates rigidly joined to the flattened faces of the upper half housings; wheel spindles journaled through the gear plates and upper half housings; journal bearings for the inner ends of said spindles; gears mounted within the half housings for rotatively connecting the axle shaft and wheel spindles; a spur gear rigidly mounted upon each wheel spindle immediately adjacent the exterior face of the gear plate; a plurality of pins ranged in a circle on the outer face of each gear plate, around said central spur gear of the wheel spindle; a plurality of spur gears mounted over said pins, and in mesh with said central spur gear; brace plates mounted over the outer faces of said gears; and an internal gear rigidly mounted on the inner side of each wheel around the hub thereof, same being adapted to mesh with said gears while the hub is freely secured upon its spindle in usual form, and means for rotating the axle shaft.

THOMAS H. SCHAEFER.

Witnesses:
A. K. DOHLE,
E. S. ZIMMERMAN.